(12) United States Patent
Hofmann et al.

(10) Patent No.: US 8,674,820 B2
(45) Date of Patent: Mar. 18, 2014

(54) DISPLAY DEVICE FOR A VEHICLE FOR DISPLAYING INFORMATION RELATING TO THE OPERATION OF THE VEHICLE AND METHOD FOR DISPLAYING THIS INFORMATION

(75) Inventors: Robert Hofmann, Berlin (DE); Gustav Hofmann, Braunschweig (DE); Sun Kyoung Han, Berlin (DE); Mathias Kuhn, Berlin (DE); Marc Amann, Berlin (DE); Rainer Dehmann, Berlin (DE)

(73) Assignee: Volkswagen AG, Wolfsburg (DE)

( * ) Notice: Subject to any disclaimer, the term of this patent is extended or adjusted under 35 U.S.C. 154(b) by 686 days.

(21) Appl. No.: 12/596,400

(22) PCT Filed: Apr. 17, 2008

(86) PCT No.: PCT/EP2008/054685
§ 371 (c)(1),
(2), (4) Date: Mar. 4, 2010

(87) PCT Pub. No.: WO2008/125694
PCT Pub. Date: Oct. 23, 2008

(65) Prior Publication Data
US 2010/0321176 A1    Dec. 23, 2010

(30) Foreign Application Priority Data
Apr. 17, 2007 (DE) .......................... 10 2007 018 072

(51) Int. Cl.
*B60Q 1/00* (2006.01)
(52) U.S. Cl.
USPC ................................ 340/438; 340/461; 345/7
(58) Field of Classification Search
USPC ........ 340/438, 459, 461, 462; 345/7; 715/700
See application file for complete search history.

(56) References Cited

U.S. PATENT DOCUMENTS

| | | | |
|---|---|---|---|
| 4,442,424 A | 4/1984 | Shirasaki et al. | |
| 6,337,672 B1 | 1/2002 | Inoguchi et al. | |
| 2002/0085043 A1 | 7/2002 | Ribak | |
| 2008/0150709 A1* | 6/2008 | Yamamoto et al. | 340/441 |
| 2009/0015395 A1 | 1/2009 | Rahe et al. | |

FOREIGN PATENT DOCUMENTS

| | | |
|---|---|---|
| DE | 43 07 367 | 9/1994 |
| DE | 199 02 136 | 8/1999 |

(Continued)

OTHER PUBLICATIONS

International Search Report, PCT/EP2008/054685 dated Jul. 16, 2008.

*Primary Examiner* — Thomas Mullen
(74) *Attorney, Agent, or Firm* — Kenyon & Kenyon LLP

(57) ABSTRACT

A display device for a vehicle for the display of information relating to the operation of the vehicle includes a display, at least one round instrument which is readable to a viewer in the area of the display, and a control device which controls the reading on the display and of the round instrument. The display device can be controlled by the control device such that the display device has a first display mode in which the at least one round instrument is displayed to the viewer and the display has a display area within the round instrument and a display area outside the round instrument, and the display device has a second display mode in which the at least one round instrument is not displayed to the viewer, the information which can be displayed by the round instrument is represented by a digital reading of the display, and the information displayed by the display in the first display mode within the round instrument is displayed in another display area of the display.

16 Claims, 9 Drawing Sheets

(56) References Cited

FOREIGN PATENT DOCUMENTS

| | | |
|---|---|---|
| EP | 1 080 976 | 3/2001 |
| EP | 1 190 886 | 3/2002 |
| EP | 1 559 995 | 8/2005 |
| EP | 1 582 393 | 10/2005 |
| JP | 10-297318 | 11/1998 |
| WO | 03/057522 | 7/2003 |
| WO | WO 2005/080139 | 9/2005 |
| WO | WO 2005/120880 | 12/2005 |

* cited by examiner

4 Control Device
5 Data Memory
6 Vehicle Bus
7 Display
9 Round Instrument
12 Screen
13 Operator Control Unit

F = 0.5

F = 1.3

DISPLAY DEVICE FOR A VEHICLE FOR DISPLAYING INFORMATION RELATING TO THE OPERATION OF THE VEHICLE AND METHOD FOR DISPLAYING THIS INFORMATION

FIELD OF THE INVENTION

The present invention relates to a display device for a vehicle for displaying information relating to the operation of the vehicle, with a display, at least one round instrument which can be displayed to a viewer in the vicinity of the display or on the display, and a control device which controls the representation on the display and the round instrument. In addition, the present invention relates to a method for displaying such information in a vehicle by a display device with a display and at least one round instrument which can be displayed to a viewer in the vicinity of the display or on the display.

BACKGROUND INFORMATION

The number of information items which are displayed to a vehicle driver is increasing continuously due to the rising number of comfort and convenience devices. The comfort and convenience devices which are used in modern vehicles include navigation devices, telecommunication devices, driver assistance systems and warning instructions relating to a large number of devices of the vehicle and to ambient conditions. In many vehicles, what are referred to as multi-function operator control and display devices are therefore used. The display of such multi-function operator control and display devices is conventionally arranged in the center console. Furthermore, such vehicles have what is referred to as a combination instrument near to the vehicle driver's main field of vision, which combination instrument displays dynamic information and monitoring information to which the vehicle driver is, under certain circumstances, intended to react immediately. Recently, the combination instruments not only have conventional round instruments but also freely programmable displays which display information from a navigation device, from a telecommunication device and in particular from the driver assistance systems. Displaying comprehensive information in the combination instrument of the vehicle has the advantage that the vehicle driver only has to avert his gaze slightly from the events on the road in order to perceive the displayed information.

However, if excessively comprehensive information is displayed in the combination instrument, the problem arises that the vehicle driver can no longer quickly and intuitively take in the desired information and he is distracted from driving by the plethora of information on the display of the combination instrument. For this reason, new systems are being developed, such as the provision of information by display devices in a vehicle, in particular by the combination instrument, in the vicinity of the vehicle driver's field of vision. For the displaying of information it is particularly important that the vehicle driver can take in the information as quickly and intuitively as possible. At the same time, the intention is that the information displayed will be particularly relevant for the vehicle driver in the respective driving situation.

German Published Patent Application No. 43 07 367 discloses a display device for a vehicle, which display device has a screen which includes an area in which a freely selectable status information item, which is called up by operator control elements, can be displayed in different forms which can be selected by the operator.

German Patent No. 199 02 136 discloses a combination instrument for a vehicle which has two display panels, the second display panel having a lower luminance than the first display panel, and the two display panels being combined with one another. The combination instrument has a darkening filter, for the transparency of which a high value is selected in wavelength ranges corresponding to a wavelength range of the light emitted by the second display panel, and to a wavelength range of light which has a color which is complementary to a color of the light which is emitted by the second display panel.

Further combination instruments for vehicles are described, for example, in European Published Patent Application No. 1 190 886, European Published Patent Application No. 1 559 995 and PCT International Published Patent Application No. WO 03/057522.

If analog display instruments, such as the round instruments for displaying the engine speed and the display of the velocity are also used in the combination instrument, the problem arises that only a limited area for displaying further information is available on the display.

SUMMARY

Example embodiments of the present invention provide a display device of the type mentioned at the beginning and a method for displaying information in a vehicle with which a variety of information can be displayed such that a viewer in the vehicle can quickly take in the information.

The display device according to example embodiments of the present invention has a control device with which the display device can be actuated such that the display device has a first display mode in which the at least one round instrument is displayed to the viewer, and the display has a display area inside the round instrument and a display area outside the round instrument, and has a second display mode in which the at least one round instrument is not displayed to the viewer, the information which can be displayed by the round instrument is represented by a digital representation on the display, and the information which is displayed inside the round instrument of the display in the first display mode is displayed in a different display area of the display.

An advantage of the two display modes which are made available by the display device is that the provision of information can be adapted to the information content, in which case it is possible in each case to select the display mode with which the viewer can take in the offered information as quickly and intuitively as possible. In the first display mode, a round instrument is displayed to the viewer, most vehicle drivers having become accustomed to such a round instrument to such an extent that they can quickly take in the information displayed by the round instrument. However, if it is necessary to display complex information in a relatively large display area, it is possible to screen off the round instrument in the second display mode and in this manner obtain display area for complex display contents. However, in this context, the information which is displayed by the round instrument in the first display mode is still displayed in digital form.

According to example embodiments of the present invention, the information which is displayed outside the round instrument in the first display mode can be displayed in a relatively large display area of the display in the second display mode. In addition, the information which is displayed inside the round instrument of the display in the first display mode can preferably be displayed further outward in the second display mode. In this manner, complex information content which requires a relatively large display area can be displayed in a more clearly arranged and more easily recognizable fashion.

According to example embodiments of the present invention, text information which can be displayed in shortened form in the first display mode can be displayed completely in an enlarged display area in the second display mode. Furthermore, for example the information which can be displayed alphanumerically in a centered fashion in the first display mode can be displayed shifted laterally in the second display mode. In addition, the information which can be displayed alphanumerically in a plurality of lines in the first display mode can be displayed in the second display mode such that at least one line of this information is shifted vertically.

According to example embodiments of the present invention, in the first display mode, at least two round instruments can be displayed to the viewer. In this case, the display has respectively a display area inside the round instruments and a display area between the two round instruments. In this case, in the second operating state, the two round instruments are not displayed to the viewer, and in the second operating state, the display includes at least four display areas: in a first display area, the information which can be displayed by at least one round instrument is displayed in digital form, in a second display area the information which is displayed inside the first round instrument of the display in the first display mode is displayed further outward, in a third display area the information which is displayed inside the second round instrument of the display in the first display mode is displayed further outward, and in a fourth display area the information which is displayed between the two round instruments of the display in the first display mode is displayed in a relatively large display area.

According to example embodiments of the present invention, an operator control element which is coupled to the control device, and by which it is possible to change from the first display mode into the second display mode and vice versa, is provided.

According to example embodiments of the present invention, the at least one round instrument is displayed on the display or by the display.

According to example embodiments of the present invention, at least one round instrument is an illuminated and/or self-illuminating electromechanical display unit. In this case, the light which represents this display unit can be presented to the viewer in the vicinity of the display by a combination device. Furthermore, a screen is provided which may be arranged such that the at least one electromechanical display unit or the round instrument which is formed thereby can at least partially no longer be seen by the viewer in the vicinity of the display.

An advantage of the use of an electrochemical display unit which can be presented to the viewer in the vicinity of the display by the combination device is that the display image of the electromechanical display device is projected in a virtual fashion at a distance in front of the display so that at least partially a three-dimensional image is generated in a virtual fashion. In this manner, in the first display mode, the information which is displayed by the round instrument is distanced from the display for the viewer so that the viewer can take in the information content of the round instrument quickly and intuitively even if complex information is displayed on the display.

Example embodiments of the present invention provide a motor vehicle having a combination instrument which is arranged near to the driver's field of vision and which includes the display device described above.

In the method according to example embodiments of the present invention, in a first display mode of the display device, the at least one round instrument is displayed to the viewer, and the display has a display area inside the round instrument and a display area outside the round instrument, and in a second display mode of the display device, the at least one round instrument is not displayed to the viewer, the information which can be displayed by the round instrument is represented by a digital representation of the display, and the information which is displayed inside the round instrument on the display in the first display mode is displayed in a different display area of the display.

The information which is displayed outside the round instrument in the first display mode can be displayed in a relatively large display area of the display in the second display mode. The information which is displayed inside the round instrument of the display in the first display mode can be displayed further outward in the second display mode. In addition, text information which can be displayed in shortened form in the first display mode can be displayed completely in an enlarged display area in the second display mode. Furthermore, information which is displayed alphanumerically in a centered fashion in the first display mode can be displayed shifted laterally in the second display mode. Finally, information which is displayed alphanumerically in a plurality of lines in the first display mode can be displayed in the second display mode such that at least one line of this information is displayed shifted vertically.

In the first display mode, at least two round instruments are preferably displayed to the viewer, wherein the display has respectively a display area inside the round instruments and a display area between the two round instruments. In this case, in the second display mode, the two round instruments can preferably not be displayed to the viewer, and the display can include the four display areas described above.

According to example embodiments of the present invention, a display image which is displayed on the display or on a part of the display is changed by changing an image parameter which is calculated as follows:

$$P_{n+1}=P_n+(P_m-P_n)\cdot F$$

In the above formula, n is a natural number, $P_0$ is the value of the image parameter of the displayed information in the initial state, $P_m$ is a constant and F is a transformation parameter.

With the method described herein, it is possible to generate a change in the display image which can be adapted to various display contents and in which the viewer can easily follow the change, so that orientation in the new display image is made easier for him. In this manner, he can take in quickly and intuitively the information which is displayed in the new display image.

According to example embodiments of the present invention, the display image changes from an initial state to a final state, with intermediate images being displayed. In this case, the index n runs from 0 to m, $P_0$ is the value of the image parameter of the displayed information in the initial state and $P_m$ is the value of the image parameter of the displayed information in the final state. The following applies for the transformation parameter F: $0<F<2$. However, it is applicable to the transformation parameter F that, in particular, it is not equal to 1.

By the transformation parameter F it is possible to determine how quickly the display image approaches the final state from the initial state in certain areas. If the transformation parameter is between 0 and 1, a rapid approach to the final state occurs with final deceleration. Relatively small values of the transformation parameter lead here to a slower approach than relatively large values of the transformation parameter.

For a slow approach to the final state, a range from 0.15 to 0.25 is preferred for the representation of information in a vehicle for the transformation parameter F, with a transformation parameter of 0.2 being particularly preferred for a slow approach.

For a medium approach to the final state, a range from 0.45 to 0.55 is advantageous for the transformation parameter for displaying information in a vehicle, with a value of 0.5 being preferred.

For a rapid approach to the final state, a range from 0.88 to 0.92 is advantageous for the transformation parameter for displaying information in a vehicle, with a value of 0.9 being preferred.

For values of the transformation parameter between 1 and 2, an oscillating approach to the final state with final deceleration occurs. With such oscillating approaches, it is advantageous, when displaying information in a vehicle, if the transformation parameter is between 1.25 and 1.35, with the value 1.3 being preferred, or between 1.45 and 1.55, with 1.5 being preferred in this case.

According to example embodiments of the present invention, the transformation parameter changes over time, and therefore F=F(n) if n indicates the index for intermediate images which succeed one another chronologically.

According to example embodiments of the present invention, the transformation parameter is greater than 2. In this case, an abort criterion for the calculation of the image parameter is defined. If the transformation parameter is greater than 2, oscillating distancing from the initial state with an acceleration in fact occurs. Relatively small values of the transformation parameter lead here to slower distancing from the initial state than relatively large values of the transformation parameter.

According to example embodiments of the present invention, the transformation parameter is smaller than 0, with an abort criterion for the calculation of the image parameter also being defined in this case. For negative values of the transformation parameter, distancing from the initial state occurs in the negative direction with acceleration. Relatively small absolute values of the transformation parameter lead to slower distancing from the initial state and to slower acceleration than larger absolute values of the transformation parameter.

For the abort criterion it is possible, for example, to define a threshold value, with an abort being carried out during the calculation of the image parameter if the absolute value of the image parameter is greater than this threshold value.

During the selection of the transformation parameter, the particular features have to be taken into account during the displaying of information in the vehicle. Conventional changes in the display image, such as are used in conventional graphics, are disadvantageous for use in a vehicle since they either require too high a level of attention from the viewer or make orientation more difficult if the viewer averts his gaze in the meantime during the transition. The calculation formula specified above for the image parameter and the indicated value ranges and values of the transformation parameter are particularly preferred for use in a vehicle, in particular a motor vehicle.

The image parameter can characterize and change the display image in various manners. The image parameter may be, for example, the position of information which is displayed in a part of the display image. If the transformation parameter is between 0 and 2 in this case, the displayed information migrates from a first part of the display image to a second part of the display image, with intermediate images being displayed during the transition from the initial state to the final state. The change between two successive intermediate images is determined by the transformation parameter. In this case, the transformation parameter therefore determines how quickly the first part approaches the second part geometrically in specific time intervals.

If the transformation parameter is greater than 2 or less than zero, migration of the displayed information, such as for example migration of a displayed object out of the display image, can be implemented. The abort criterion is determined in this case by virtue of the fact that the displayed information is no longer displayed in the display area.

A change in position should be understood in the present context to mean both translation and rotation, as well as combinations of these two operations for information which is displayed in the display image.

According to example embodiments of the present invention, the image parameter relates to the brightness of information which is displayed on the display. If the transformation parameter is between 0 and 2, the brightness of the displayed information therefore changes from an initial brightness into a final brightness, with intermediate brightness levels being displayed during the transition from the initial brightness into the final brightness. If the transformation parameter is greater than 2 or less than zero in this case, the displayed information can be screened off by a transition into a state of maximum brightness, for example a white image, or a state of minimum brightness, for example a black image. In this case, a certain maximum value or minimum value for the brightness is defined as an abort criterion.

According to example embodiments of the present invention, the image parameter relates to the color of information which is displayed on the display. In this case, for a transformation parameter between 0 and 2 the color of the displayed information changes from an initial color into a final color, with intermediate colors being displayed during the transition. In this case, the term "color" covers both the shade and the color saturation.

According to example embodiments of the present invention, the image parameter relates to the scaling of information which is displayed on the display. For transformation parameters between 0 and 2, the information which is displayed can therefore be enlarged or reduced in size.

According to example embodiments of the present invention, the image parameter relates to the transparency of information which is displayed on the display. For transformation parameters between 0 and 2, information which is superimposed on another image can be made more visible or less visible. For transformation parameters which are less than 0 or greater than 2, the information which is displayed can also be made to disappear completely or be made non-transparent.

The change in the image parameter makes it possible to control, in particular, the changeover from the first display mode into the second display mode, and vice versa. The image parameter can control how display areas change in terms of their position, scaling, color and/or transparency.

In example embodiments of the present invention it is also possible to actuate the display device with the control device such that when there is a change in the display image the image parameter changes as explained above.

Example embodiments of the present invention are described in more detail below with reference to the appended Figures.

DETAILED DESCRIPTION

Figure 1:
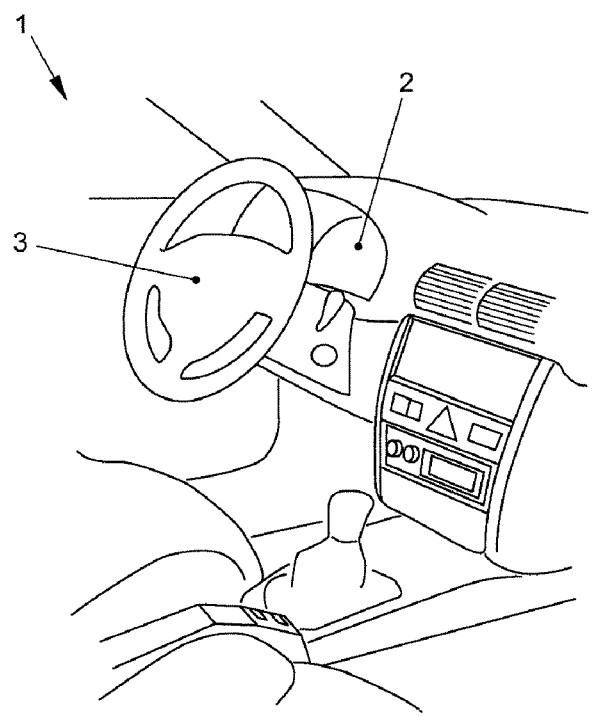
FIG. 1 is a schematic view of the arrangement of an exemplary embodiment of the display device.

FIG. 1 shows an example of an internal view of a motor vehicle 1. In the motor vehicle 1, a display device 2, which is arranged as a combination instrument and whose display is located in the driver's field of vision or near to the driver's field of vision, is arranged behind a steering wheel 3.

Figure 2:
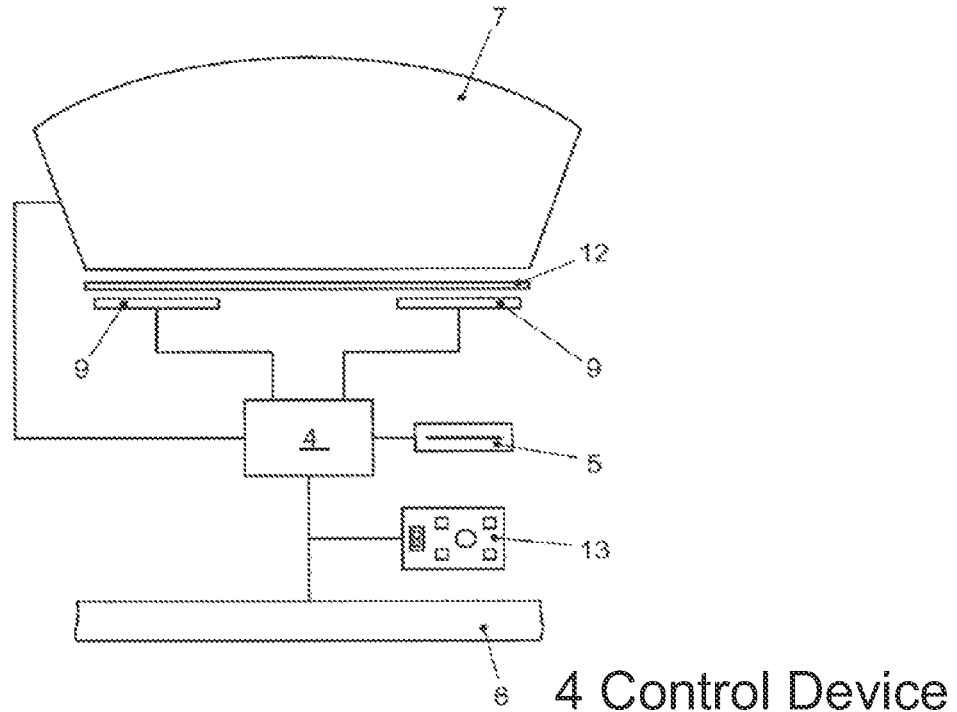
FIG. 2 shows an exemplary embodiment of the display device.

The basic arrangement of the display device 2 is illustrated in FIG. 2. The display device 2 includes a control device 4 which is connected in terms of data-transmission technology to a vehicle bus 6. In this manner, data can be transmitted to the control device 4, and from the data the control device can generate graphics data for the display of the display device 2. In addition, the control device 4 can also receive data via other interfaces. For example, the control device 4 can be coupled directly to sensors and control devices of the vehicle or to other devices for generating graphics data.

Furthermore, the control device 4 is connected to a data memory 5 from which data which is necessary for generating the graphics data can be read out. The data memory 5 may contain, for example, one or more digital road maps. In addition, presettings, image parameters and manipulated values may be stored in the data memory 5.

Furthermore, the control device 4 is connected to an operator control unit 13 which includes an operator control element or a plurality of operator control elements. A user can control the displays and representations of the display device 2 by the operator control unit 13.

The control device is also connected to a freely programmable display 7 which has various display areas. In addition, the control device 4 is connected to two electromechanical round instruments 9.

The display 7 can be a matrix display, for example an LCD (liquid crystal display), in particular a color display using TFT (thin film transistor) technology. Furthermore, the display can be what is referred to as a twisted nematic liquid crystal display (TN-LCD), a super twisted nematic (STN) display, a double-layer STN, an FLC (ferroelectric liquid crystal) display or an SSFLC (surface stabilized ferroelectric liquid crystal). A background lighting device, which can be made available by one or more light-emitting diodes, is assigned to the display 7.

The control device 4 also controls, e.g., in a conventional manner, two round instruments 9 which are provided, for example, for displaying the velocity and engine speed. The round instruments 9 include a scale and a pointer whose rotational angle is determined by a control signal of the control device 4. A lighting device is provided separately for each of the round instruments 9, which lighting device can be switched on and off by the control device. The light which represents the round instruments 9 can be displayed completely or partially to the viewer in the vicinity of the display 7 by the combination device 10. In this manner, the round instruments 9 can be displayed or not displayed in the vicinity of the display 7 by a control signal of the control device 4.

In the text which follows, the arrangement of the display 7, of the round instruments 9 and of the combination device 10 will be explained in detail with reference to FIG. 3.

The display 7 of the display device 2 is arranged such that it is arranged in the driver's direct field of vision 8, as is shown in FIG. 1. The round instruments 9 are arranged horizontally underneath the driver's field of vision 8 in the exemplary embodiment shown in FIG. 3, so that the plane which is formed by the round instruments 9 lies in the direction 8 in which the driver views the display 7. The round instruments 9 can, in particular, be arranged underneath the field of vision 8. The round instruments 9 are constructed and arranged as in a conventional combination instrument. The scales of the round instruments 9 are of self-illuminating or illuminated design. They include an illuminated or a self-illuminating rotatable pointer for indicating the current value which is to be displayed.

The central axes 7a and 9a of the display 7 and of the round instruments 9 are advantageously arranged at an angle α of 90° with respect to one another. The combination device 10 is provided at an angle of 45° to the round instrument 9.

Figure 3:
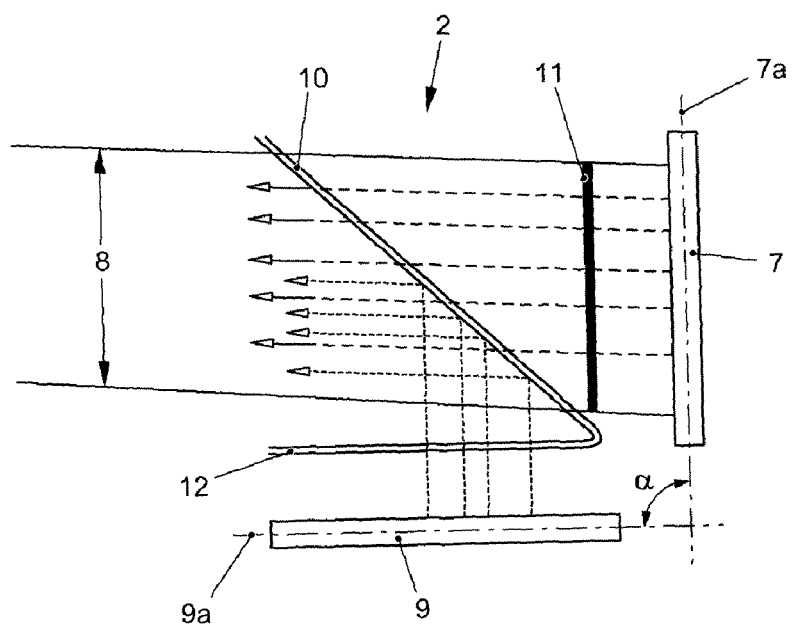
FIG. 3 shows the arrangement of the display, of the round instrument and of the combination instrument in an exemplary embodiment of the display device.

In the exemplary embodiment shown in FIG. 3, the combination device 10 is a planar semi-transparent mirror which is constructed such that it is transparent to the light which represents the display 7, so that a viewer perceives the representation of the display directly. The light which represents the round instruments 9 is reflected by the semi-transparent mirror 10, so that the light appears to the viewer to be positioned in front of the representation of the display 7 as a virtual image 11. A screen 12 made of semi-transparent material is provided between the combination device 10 and the round instrument 9, the screen 12 being constructed such that it is transparent to the light which represents the round instruments 9, and covers the round instruments 9 with respect to the viewer, at least in the switched-off state. The control device 4 can therefore respectively switch the round instruments 9 on and off, so that the round instruments 9 are displayed, or are not displayed, to the viewer in front of the display 7.

In the switched-on state of the round instruments 9, i.e. when they light up or are illuminated, a virtual image 11 of the round instruments 9 appears to the viewer in front of the display 7. If the round instruments 9 are switched off, the virtual image 11 disappears, and the round instruments 9 cannot be seen by the viewer. The round instruments 9 can, of course, be switched on and off separately by the control device 4. In addition, the screen 12 can be arranged such that only certain areas of the round instruments 9 or of the associated pointers appear in the virtual image 11. In the present exemplary embodiment, in each case just one radially outer section of the pointers can be seen in the virtual image 11.

According to another exemplary embodiment, the round instruments 9 are displayed by the display 7.

With reference to FIGS. 4A to 5B, the representation of the display 7 and the displaying of the round instruments 9 are explained for various display modes, such a they appear to a viewer in the exemplary embodiment of the display device and of the method.

Figure 4A:
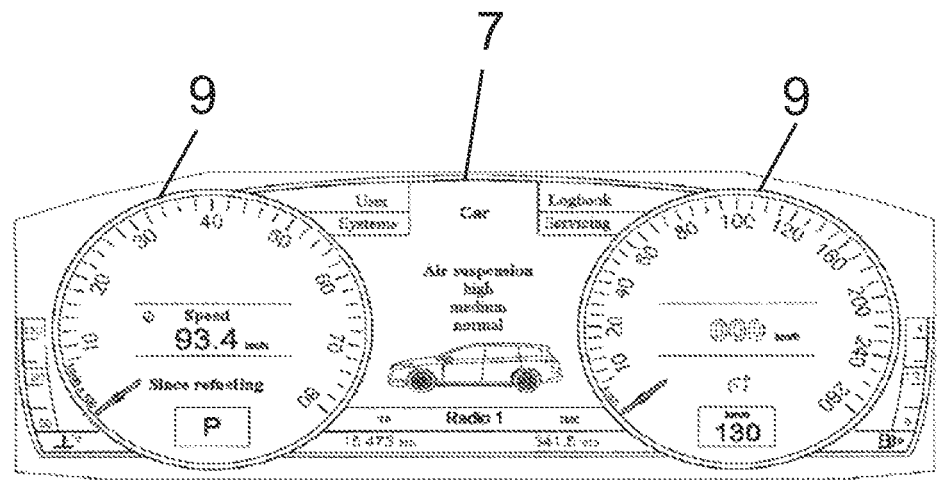
FIGS. 4A and 4B show an example of a display in the first and second display modes.

FIG. 4A shows the view of the representation of the display device 2 when the display device 2 is in the first display mode. The control device 4 actuates the round instruments 9 such that they can be seen as a virtual image at a distance in front of the display. The virtual image of the round instruments 9 shows an illuminated ring in which scale bars which are illuminated radially in an inward direction are arranged. In addition, an illuminated pointer is shown. The pointer extends radially in the direction of the scale bars. However, only the radially outer section of the pointer can be seen, so that a freely available display area of the display 7 remains within the round instruments.

The left-hand round instrument 9 indicates the engine speed of the vehicle, and the right-hand round instrument 9 the velocity of the vehicle, in a conventional fashion.

The display 7 is actuated by the control device 4 such that different display areas are formed. A display area for a multi-function display (MFA) is formed on the display 7 inside the round instrument 9 for the engine speed. In the example shown in FIG. 4A, the average velocity since the vehicle was last refueled is indicated. In addition, the display 7 gives numerical information for the scale of the round instrument 9 for the engine speed. The scale for the engine speed is not closed to form a complete ring but rather includes monitoring displays in the lower area.

To the left next to the display of the round instrument 9 for the engine speed, the display 7 includes a display area for the representation of the cooling temperature.

Inside the right-hand round instrument 9 for the velocity, a display area for driver assistance systems is provided in the display 7. In the example shown in FIG. 4A, information relating to the velocity control system (VSC) is displayed. In addition, the numerical information which is associated with the scale of the round instrument 9 for the velocity display is displayed. The scale for the velocity display of the round instrument 9 is not closed to form a complete ring but rather includes a digital representation of the vehicle velocity in the lower area.

To the right next to the round instrument 9 for the velocity display, a display area for the fuel tank display is provided on the display 7.

Between the two round instruments an area remains in which a large amount of information, which in some manner relates to the operation of the vehicle can be displayed in a variable fashion.

In this area, it is possible to display instructions from the navigation system, a digital road map of the navigation system, operating parameters of the vehicle, information relating to the infotainment system of the vehicle including information relating to all the multimedia devices of the vehicle, information of a telephone or any other information of the vehicle which can be selected as desired or displayed automatically. In the example shown in FIG. 4A, information relating to the air suspension of the vehicle's suspension system is displayed.

In the lower area of the display area between the two round instruments 9, there are two status lines in which the total number of kilometers traveled, the kilometers traveled on a particular journey and specific information relating to the infotainment system are displayed. In the upper part of the display area between the two round instruments 9, control buttons are provided for controlling the display device 2.

The display device 2 can be controlled by the operator control unit 13. The operator control unit 13 includes, in particular, an operator control element with which it is possible to change between the first display mode and the second display mode. In addition, it is also possible to change automatically between the display modes by the control device 4 if the illustrated information content on the display 7 requires this. The control device 4 can, in this case, change the display mode automatically as a function of the data stored in the memory 5.

Figure 4B:
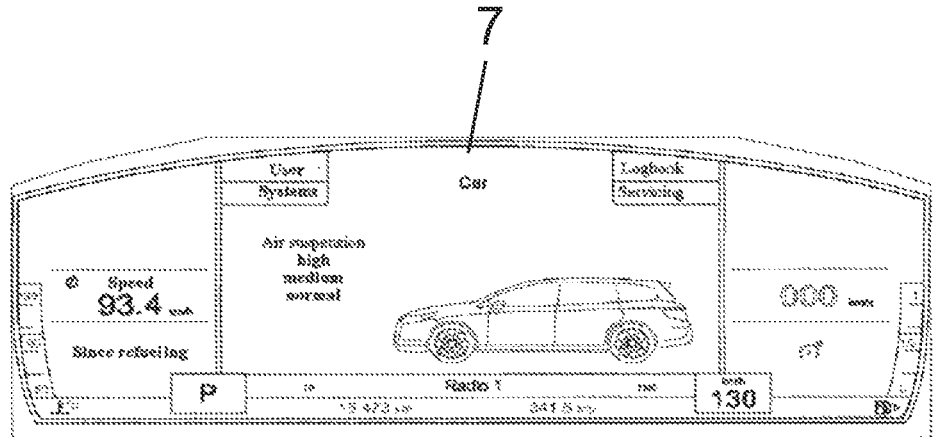

In FIG. 4B, the view of the display device 2 which is associated with FIG. 4A is shown in the second display mode. A significant difference between the second display mode and the first display mode is that in the second display mode the two round instruments 9 can no longer be seen by the viewer. The control device 4 has switched off the illumination of the round instruments 9, so that by virtue of the screen 12 the virtual image 11 of the round instruments 9 in the vicinity of the display 7 can no longer be seen by the viewer. As a result, the display areas which are formed on the display 7 by the control device 4 can be changed such that they make available a representation of the current display contents which can be understood more quickly and more intuitively by the vehicle driver. At the same time, the information which can be displayed by the round instrument 9 should be represented by a digital representation of the display, at least for the display content of a round instrument 9, specifically that of the velocity display. In addition it should be ensured that the vehicle driver does not lose orientation at the transition from the first display mode to the second display mode, and vice versa.

In the example shown in FIG. 4B, the velocity display of the round instrument 9 continues to be represented in the display area of the display 7 in which the velocity has already been displayed in digital form in the first display mode. This facilitates orientation for the vehicle driver when the analog round instrument disappears in the second display mode. The driver can continue to orientate himself with respect to the digital velocity display which has already appeared in the first display mode.

Furthermore, the information which is displayed inside the two round instruments 9 of the display 7 in the first display mode migrates into a different display area of the display 7, specifically migrate outward, in the second display mode. However, in this context, the horizontal orientation of these display contents is maintained. This also provides the vehicle driver with assistance in orientating himself at the changeover between the two display modes.

After the round instruments 9 are no longer displayed as a virtual image 11 in front of the display 7 in the second display mode and the display content which is displayed inside the round instruments in the first display mode has been moved outward, there results, in the display area in the center of the display 7, a relatively large display area for the display contents which are displayed between the two round instruments 9 in the first display mode. In this manner, a very much more clearly arranged, more easily recognizable and more detailed display of information can be implemented in this display area in the second display mode.

FIG. 4B shows how the central display area changes in the second display mode. The representation of the vehicle is increased considerably. The text information relating to the air suspension of the vehicle's suspension system which had been illustrated in a centered fashion in the first display mode moves onto the left-hand side of this central display area and is illustrated flush with the left. In this context, the horizontal orientation is maintained again in order to facilitate orientation for the vehicle driver when there is a changeover between the two display modes.

Figure 5A:
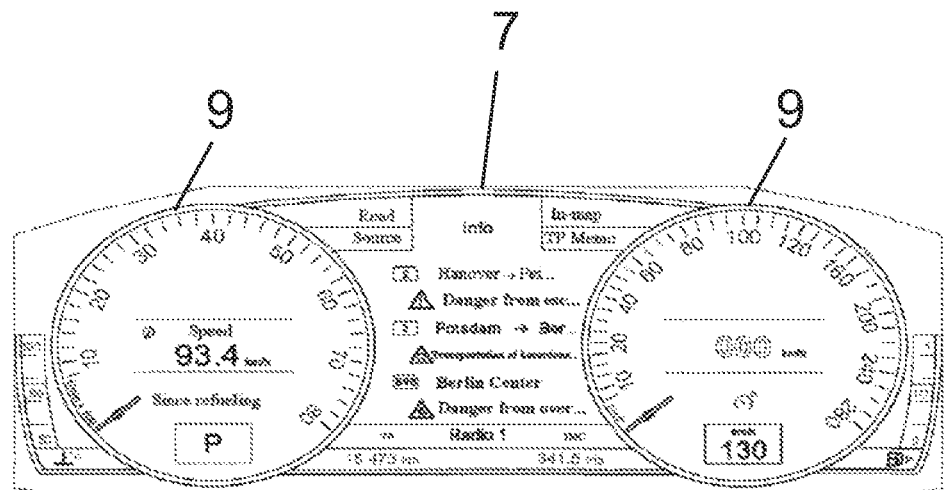
FIGS. 5A and 5B show a further example of the display in the first and second display modes.
Figure 5B:
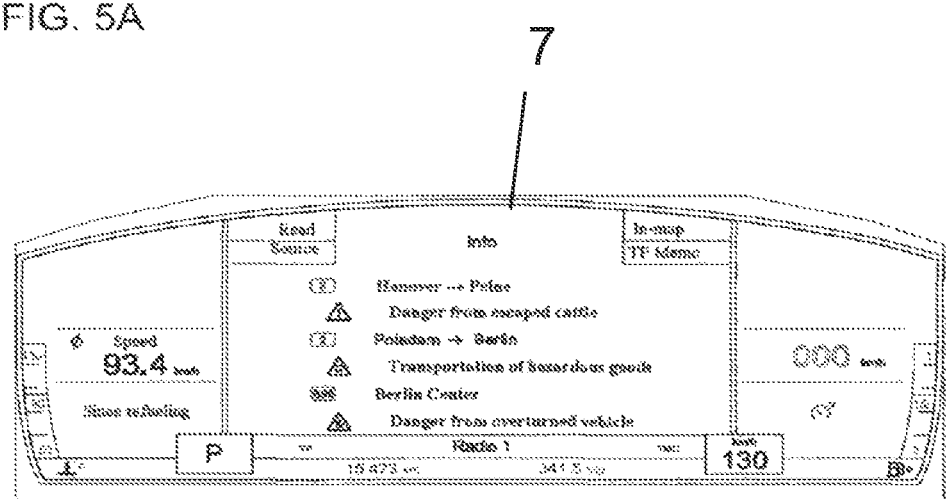

FIGS. 5A and 5B show a further example of a view of the display device 2 in the first and second display modes. Traffic information from the navigation system is displayed in the central display area between the representation of the two round instruments 9. In the first display mode (FIG. 5A), the size of this display area is not sufficient to completely display the alphanumerically displayed traffic information. At the transition into the second display mode (FIG. 5B), the central display area becomes larger, so that the alphanumeric traffic information can be displayed written out completely. In addition, it would be possible for one line which contains alphanumeric information in the first display mode to be displayed shifted vertically in the second display mode. For example, two lines from the first display mode can be combined to form one line in the second display mode.

Figure 6:
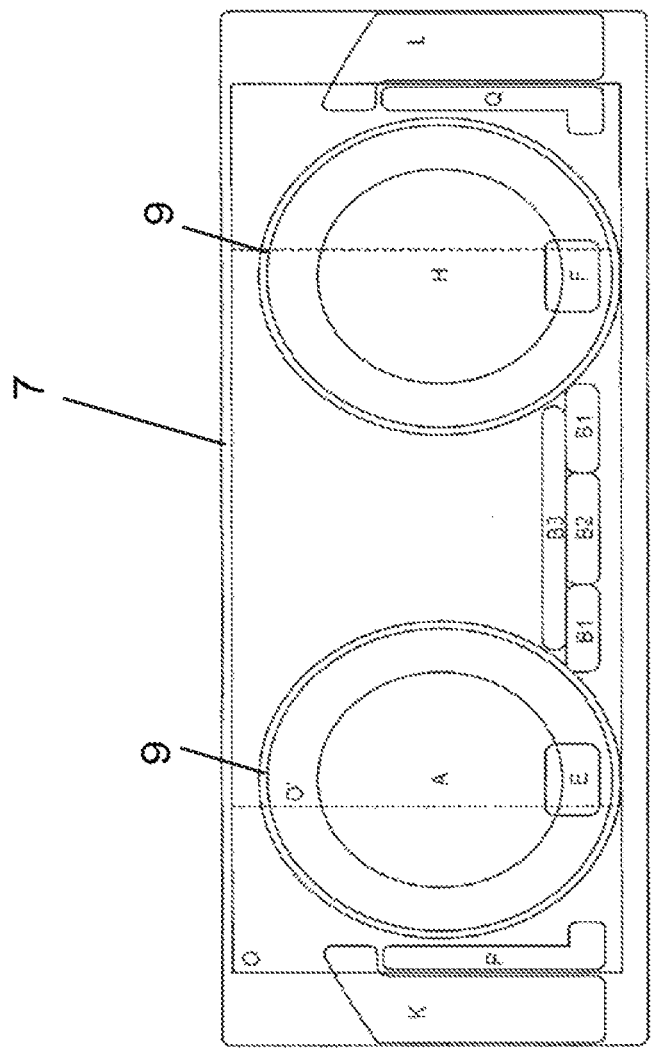
FIG. 6 shows the apportioning of the display areas of the display and of the round instruments of the exemplary embodiment of the display device for the first display mode.

The display areas of the first display mode will be explained once more below with reference to FIG. 6. It is to be noted here that FIG. 6 is not a true-to-scale representation.

O denotes the total display area of the display 7. O' denotes the display area of the infotainment system, which also includes the display area between the round instruments. The display area A inside the round instrument 9 for the engine speed is used as a primary warning area, as a multi-function display, for representations of arrows of the navigation system, for a compass, etc.

The display area P on the outer left next to the round instrument 9 for the engine speed is used for the display of the cooling temperature. In addition, an area K can be provided which is located partially outside the total display area O of the display 7 and which is used for monitoring displays.

The display area E in the vicinity of the round instrument 9 for the engine speed, which display area E is located in the vicinity of the incomplete scale for the engine speed, is used for a selection range display.

The display area H inside the round instrument 9 for the velocity display is used for displays of the driver assistance systems such as, for example, for displays of the cruise controller and of an adaptive cruise control (ACC) system.

The display area F inside the scale which is in the form of an incomplete ring, for the velocity display of the round instrument 9 is used for the digital velocity display. The display area Q on the outer right next to the round instrument 9 for the velocity display is used for the fuel tank display. In addition, an area L for monitoring displays can be provided partially outside the total display area O of the display 7.

Finally, in the display area O' for the infotainment system, status lines are provided in the lower area between the representation of the two round instruments 9. The status line B1 is provided for kilometer display and the display of the time, the status line B2 is provided for monitoring displays and temperature displays, such as the external temperature or the internal temperature, and the status line B3 is provided for further displays of the infotainment system.

Figure 7:
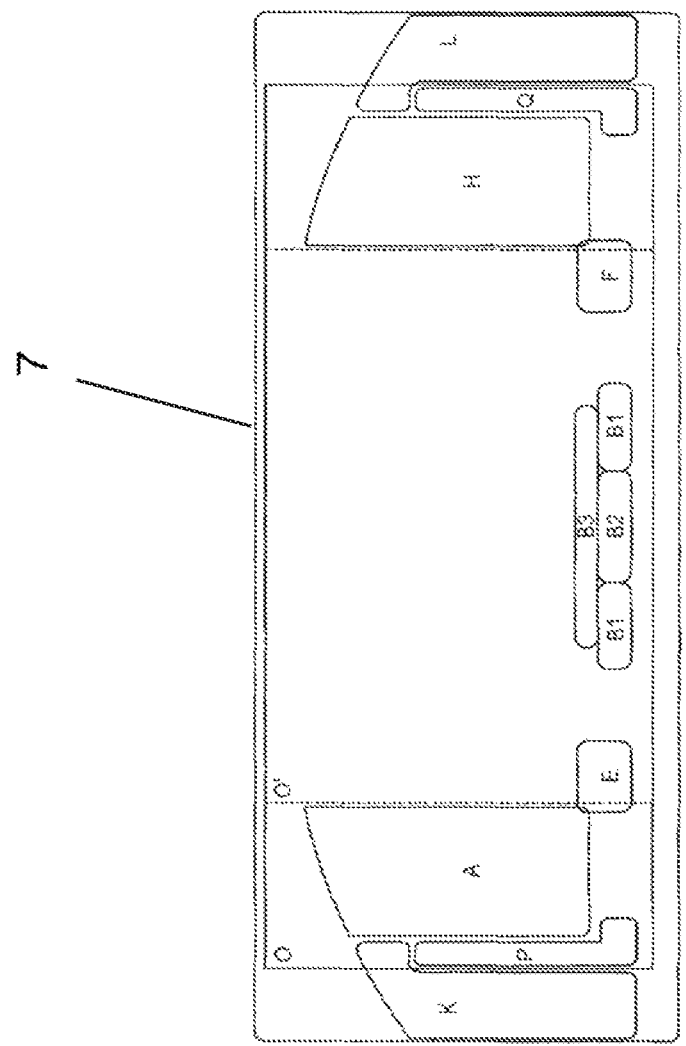
FIG. 7 shows the apportioning of the display areas of the display of the exemplary embodiment of the display device for the second display mode.

The display areas of the display 7 in the second display mode will be explained with reference to FIG. 7. This case also is not a true-to-scale representation.

The display areas O, O', P, K, E, F, Q, L, B1, B2 and B3 remain unchanged compared to the first display mode. However it is to be borne in mind here that the virtual image of the round instruments 9 is no longer superimposed on the display area O'.

The display areas A and H which are arranged inside the round instruments 9 in the first display mode, respectively move outward in the second display mode, so that they no longer overlap with the display area O'. The display area O' therefore is of the same size in the two display modes. However, in the second display mode, parts of the representation of the round instruments 9 and parts of the display areas A and H are no longer superimposed on this display area O'. In the second display mode, there remains a very much larger effective area for displaying information in the display area O' for the displays of the infotainment system than in the first display mode.

In the text which follows, the representation on the display 7 will be explained when there is a changeover from the first display mode into the second display mode, and vice versa. In this context, the change in the geometric location and in the scaling of a graphic at the changeover between the display modes will be described by way of example. However, it is also possible to implement other changes in the display image in the same manner. For example, the brightness, the color or the transparency or combinations of these image parameters can be changed.

In the following description, an image parameter P characterizes the geometric position of the graphic at the changeover from the initial state to the final state and its scaling. The intermediate images which are displayed between the initial state and the final state are calculated as follows in terms of the image parameter P:

$$P_{n+1} = P_n + (P_m - P_n) \cdot F$$

The index n runs from 0 to m in this case. The value of the image parameter $P_0$ characterizes the geometric location and the scaling of the graphic in the initial state. The image parameter $P_m$ characterizes the graphic in terms of its location and its scaling in the final state. By the transformation parameter F it is possible to determine whether the velocity display approaches the final state directly or in an oscillating fashion. In addition, it is possible to set the accelerations when the image parameter changes. Each value of the image parameter $P_0, P_1, P_2, \ldots, P_n$ characterizes an intermediate image. The time interval between two intermediate images is chosen to be constant. The display images are therefore displayed with a fixed frequency on the display 7.

Figure 8:
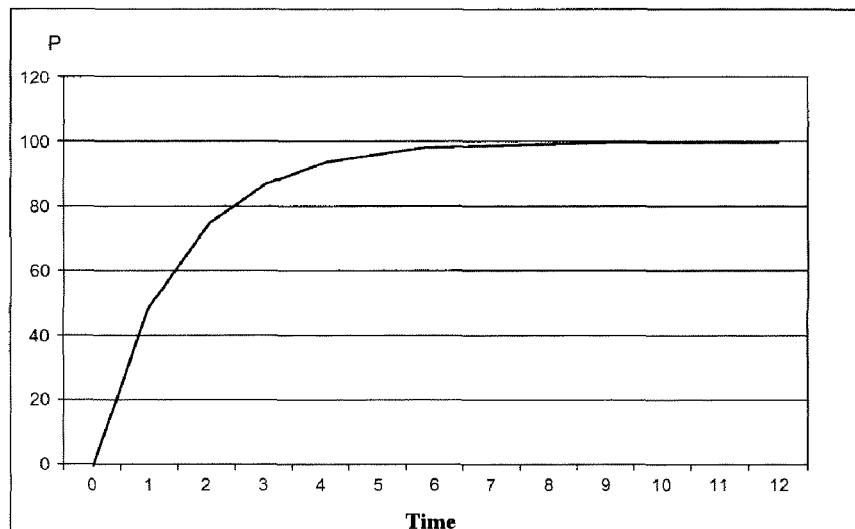
FIG. 8 shows an example of a change in the image parameter over time at the changeover between the display modes for a transformation parameter F=0.5.

A preferred example of the transformation parameter F is displayed graphically in FIG. 8. FIG. 8 shows a curve for F=0.5. The image parameter P is displayed in random units. A value of 0 has been selected for the initial state $P_0$, and a value of 100 has been selected for the final state $P_m$.

As is apparent from FIG. 8, the curve firstly shows, for the approach to the final state, a high acceleration which increasingly flattens out. Overall, a medium-fast approach to the final state is shown. In this context, the acceleration is firstly relatively high and it slows increasingly with time. The final state is reached only after 32 display images. However, after 9 intermediate images, 99% of the approach of the display state to the final state has already occurred. In such a case it would be possible to define an abort criterion, so that the iteration is aborted if a certain amount of the approach of the image parameter P to the final state has occurred.

Figure 9:
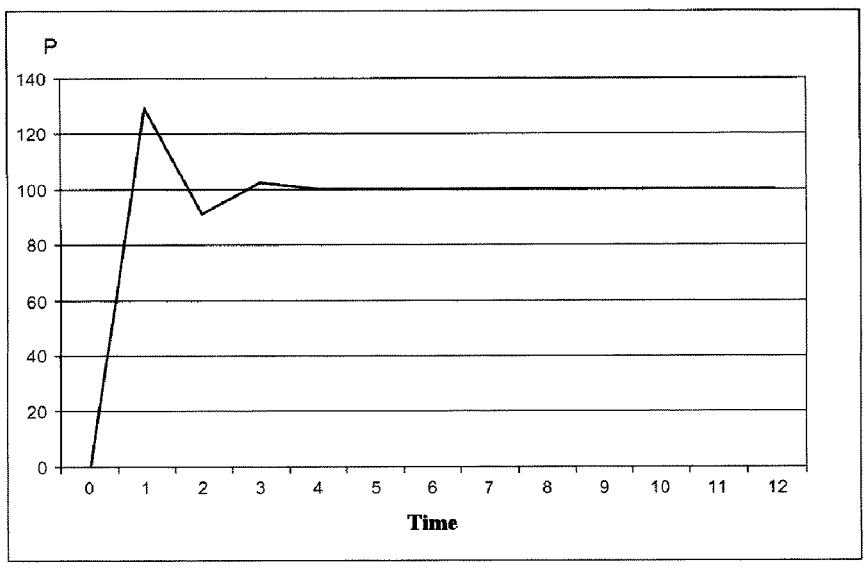
FIG. 9 shows an example of a change in the image parameter over time at the changeover between the display modes for a transformation parameter F=1.3.

FIG. 9 shows an oscillating approach to the final state. A transformation parameter F=1.3 was selected here. A relatively rapid oscillating approach to the final state occurs. After only five images, the difference from the final state is less than 1%. After eighteen display images, the final state is reached. The abort criterion mentioned above could also be applied in this case.

An oscillating approach to the final state, as has been achieved by the curve shown in FIG. 9, produces, in the display image, a change which appears very natural and not too technical to a viewer. It corresponds to a springing action such as the viewer knows from processes in his natural environment. As a result, the viewer can more easily follow the change in the display image, which facilitates his orientation at the transition from the initial state to the final state.

LIST OF REFERENCE NUMERALS

1 Motor vehicle
2 Display device
3 Steering wheel
4 Control device
5 Data memory
6 Vehicle bus
7 Display
7a Central axis of the display
8 Field of vision
9 Round instrument
9a Central axis of the round instrument
10 Combination device
11 Virtual image
12 Screen
13 Operator control unit

The invention claimed is:

1. A display device for a vehicle for displaying information relating to operation of the vehicle, comprising:
a display;
at least one round instrument displayable to a viewer (a) in a vicinity of the display or (b) on the display; and
a control device adapted to control representation on the display and the round instrument;
wherein the control device is adapted to actuate the display device to have: (a) a first display mode in which the at least one round instrument is displayed to the viewer, and the display has a display area inside the round instrument and a display area outside the round instrument; and (b) a second display mode in which the at least one round instrument is not displayed to the viewer, information displayable by the round instrument is represented by a digital representation on the display, and information displayed inside the round instrument of the display in the first display mode is displayed in a different display area of the display in the second display mode that is different from the display area inside the round instrument in the first display mode;
wherein the display device is actuatable with the control device such that, when there is a change in what is displayed, an image parameter changes, the image parameter being calculated as follows:

$$P_{n+1} = P_n + (P_m - P_n) \cdot F$$

where n represents a natural number between 0 and m, Pn represents a value of the image parameter of the displayed information in an intermediate stage, in which $P_0$ represents a value of the image parameter of the displayed information in an initial state when n is 0, $P_m$ represents a constant and F represents a transformation parameter.

2. The display device according to claim 1, wherein information is displayed outside the round instrument in the first display mode and is displayable in a relatively large display area of the display in the second display mode.

3. The display device according to claim 1, wherein the information displayed inside the round instrument of the display in the first display mode is displayable in the different display area of the display in the second display mode further outward toward a periphery of the display.

4. The display device according to claim 1, wherein text information displayable in shortened form in the first display mode is displayable completely in an enlarged display area in the second display mode.

5. The display device according to claim 1, wherein alphanumeric information displayable in a centered fashion in the first display mode is displayable shifted laterally in the second display mode.

6. The display device according to claim 1, wherein, in the first display mode, alphanumeric information is displayable in a plurality of lines, and, in the second display mode, at least one line of the alphanumeric information is displayable shifted vertically.

7. The display device according to claim 1, wherein, in the first display mode, at least two round instruments are displayable to the viewer, and the display has respectively a display area inside the round instruments and a display area between the two round instruments.

8. The display device according to claim 7, wherein, in the second display mode, the two round instruments are not displayed to the viewer, and in the second display mode, the display includes at least four display areas, wherein in a first display area, the information displayable by at least one round instrument of the two round instruments is displayable in digital form, in a second display area the information displayable inside a first round instrument of the two round instruments in the first display mode is displayable in the different display area of the display in the second display mode further outward toward a periphery of the display, in a third display area the information displayable inside a second round instrument of the two round instruments in the first display mode is displayable in the different display area of the display in the second display mode further outward toward a periphery of the display, and in a fourth display area the information displayable between the two round instruments in the first display mode is displayable in a relatively large display area.

9. The display device according to claim 1, further comprising an operator control element coupled to the control device and adapted to change between the first display mode and the second display mode.

10. The display device according to claim 1, wherein the at least one round instrument includes (a) an illuminated and/or (b) a self-illuminating electromechanical display unit, the illuminated and/or self-illuminating electromechanical display unit representing the display unit is presentable to the viewer in the vicinity of the display by a combination device.

11. The display device according to claim 10, further comprising a screen adapted to at least partially obstruct the electromechanical display unit so that the round instrument which is formed by this display unit is at least partially no longer displayed to the viewer in the vicinity of the display.

12. A motor vehicle, comprising:
a combination instrument arranged (a) in, or (b) near to, a field of vision of a driver, the combination instrument including a display device adapted to display information relating to operation of the vehicle, the display device including:
a display;
at least one round instrument displayable to a viewer (a) in a vicinity of the display or (b) on the display; and
a control device adapted to control representation on the display and the round instrument;
wherein the control device is adapted to actuate the display device to have: (a) a first display mode in which the at least one round instrument is displayed to the viewer, and the display has a display area inside the round instrument and a display area outside the round instrument; and (b) a second display mode in which the at least one round instrument is not displayed to the viewer, information displayable by the round instrument is represented by a digital representation on the display, and information displayed inside the round instrument of the display in the first display mode is displayed in a different display area of the display in the second display mode that is different from the display area inside the round instrument in the first display mode;

wherein the display device is actuatable with the control device such that, when there is a change in what is displayed, an image parameter changes, the image parameter being calculated as follows:

$$P_{n+1}=P_n+(P_m-P_n)\cdot F$$

where n represents a natural number between 0 and m, Pn represents a value of the image parameter of the displayed information in an intermediate stage, in which $P_0$ represents a value of the image parameter of the displayed information in an initial state when n is 0, $P_m$ represents a constant and F represents a transformation parameter.

13. A method for displaying information relating to operation of a vehicle, in the vehicle by a display device having a display and at least one round instrument displayable to a viewer (a) in a vicinity of the display or (b) on the display, comprising:

in a first display mode of the display device, displaying the at least one round instrument to the viewer, the display having a display area inside the round instrument and a display area outside the round instrument;

in a second display mode of the display device, not displaying the at least one round instrument to the viewer, representing information displayable by the round instrument by a digital representation on the display, and displaying information displayable inside the round instrument of the display in the first display mode in a different display area of the display in the second display mode that is different from the display area inside the round instrument in the first display mode; and changing a display image displayed on the display by changing an image parameter which is calculated as follows:

$$P_{n+1}=P_n+(P_m-P_n)\cdot F$$

wherein n represents a natural number between 0 and m, Pn represents a value of the image parameter of the displayed information in an intermediate stage, in which $P_0$ represents a value of the image parameter of the displayed information in an initial state when n is 0, $P_m$ represents a constant, and F represents a transformation parameter.

14. The method according to claim 13, wherein, in the first display mode, at least two round instruments are displayed to the viewer, and the display has respectively a display area inside the round instruments and a display area between the two round instruments.

15. The method according to claim 14, wherein, in the second display mode, the two round instruments are not displayed to the viewer, and in the second display mode, the display includes at least four display areas, wherein in a first display area, at least the information displayable by a round instrument of the two round instruments is displayed in digital form, in a second display area the information displayable inside a first round instrument of the two round instruments in the first display mode is displayable in the different display area of the display in the second display mode further outward toward a periphery of the display, in a third display area the information displayable inside a second round instrument of the two round instruments in the first display mode is displayable in the different display area of the display in the second display mode further outward toward a periphery of the display, and in a fourth display area the information displayable between the two round instruments in the first display mode is displayed in a relatively large display area.

16. The method according to claim 13, wherein the display device comprises:

a display;

at least one round instrument displayable to a viewer (a) in a vicinity of the display or (b) on the display; and a control device adapted to control representation on the display and the round instrument;

wherein the control device is adapted to actuate the display device to have: (a) a first display mode in which the at least one round instrument is displayed to the viewer, and the display has a display area inside the round instrument and a display area outside the round instrument; and (b) a second display mode in which the at least one round instrument is not displayed to the viewer, information displayable by the round instrument is represented by a digital representation on the display, and information displayed inside the round instrument of the display in the first display mode is displayed in a different display area of the display in the second display mode that is different from the display area inside the round instrument in the first display mode;

wherein the display device is actuatable with the control device such that, when there is a change in what is displayed, an image parameter changes, the image parameter being calculated as follows:

$$P_{n+1}=P_n+(P_m-P_n)\cdot F$$

where n represents a natural number between 0 and m, Pn represents a value of the image parameter of the displayed information in an intermediate stage, in which $P_0$ represents a value of the image parameter of the displayed information in an initial state when n is 0, $P_m$ represents a constant and F represents a transformation parameter.

* * * * *

UNITED STATES PATENT AND TRADEMARK OFFICE
CERTIFICATE OF CORRECTION

PATENT NO. : 8,674,820 B2  Page 1 of 1
APPLICATION NO. : 12/596400
DATED : March 18, 2014
INVENTOR(S) : Hofmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Twenty-ninth Day of September, 2015

Michelle K. Lee
*Director of the United States Patent and Trademark Office*